(12) United States Patent
Hayashi et al.

(10) Patent No.: US 8,128,168 B2
(45) Date of Patent: Mar. 6, 2012

(54) BEARING BUSH FOR SEAT RECLINING DEVICE AND SEAT RECLINING DEVICE

(75) Inventors: Takumi Hayashi, Mie (JP); Satoru Fukuzawa, Mie (JP)

(73) Assignee: NTN Corporation, Osaka (JP)

( * ) Notice: Subject to any disclaimer, the term of this patent is extended or adjusted under 35 U.S.C. 154(b) by 127 days.

(21) Appl. No.: 12/683,246

(22) Filed: Jan. 6, 2010

(65) Prior Publication Data

US 2010/0176640 A1 Jul. 15, 2010

(30) Foreign Application Priority Data

Jan. 7, 2009 (JP) .................................. 2009-001911

(51) Int. Cl.
*B60N 2/22* (2006.01)
*B60N 2/235* (2006.01)

(52) U.S. Cl. ....................................................... 297/362
(58) Field of Classification Search .................... 297/362
See application file for complete search history.

(56) References Cited

U.S. PATENT DOCUMENTS 6,755,470 B2 *  6/2004  Iwata et al.  ............... 297/362
7,878,594 B2 *  2/2011  Fukuzawa et al. ............ 297/362

FOREIGN PATENT DOCUMENTS

| JP | H03-237904 A | 10/1991 |
| JP | 2002-327750 A | 11/2002 |
| JP | 2004-033401 A | 2/2004 |
| JP | 2008-006265 A | 1/2008 |

\* cited by examiner

*Primary Examiner* — Rodney B White
(74) *Attorney, Agent, or Firm* — Hedman & Costigan, P.C.; James V. Costigan (57) ABSTRACT

A bearing bush, disposed in a shaft hole of an external gear of a seat reclining device, which slidingly contacts wedge-shaped pieces. The seat reclining device has a differential transmission mechanism for adjusting an open angle of a hinge connecting a seating surface of a seat and a backrest thereof to each other. The differential transmission mechanism has an internal gear; an external gear, having a smaller number of teeth than the internal gear, which engages the internal gear; a pair of the wedge-shaped pieces disposed in a circular arc-shaped gap formed between the shaft hole of the external gear and a shaft of the internal gear with tapered ends of the wedge-shaped pieces opposed to each other; and a compression coil spring for imparting an elastic force to the wedge-shaped pieces in a direction in which the wedge-shaped pieces depart from each other. When the wedge-shaped pieces are moved in sliding contact with the bearing bush inside the circular arc-shaped gap with the wedge-shaped pieces being pressed by a cam provided on the shaft of the internal gear, the external gear disengages from the internal gear, whereby the open angle of the hinge is adjustable. A sliding surface of the bearing bush is formed of a fluorocarbon resin composition containing fluorocarbon resin to which thermoplastic resin, carbon fibers, and molybdenum disulfide are essentially added.

23 Claims, 6 Drawing Sheets

BEARING BUSH FOR SEAT RECLINING DEVICE AND SEAT RECLINING DEVICE

BACKGROUND OF THE INVENTION

1. Field of the Invention

The present invention relates to a bearing bush for a seat reclining device and the seat reclining device. More particularly the present invention relates to a bearing bush for a reclining device suitable for a car seat and the seat reclining device having the bearing bush.

2. Description of the Related Art

To adjust an open angle of a hinge connecting a seating surface of a seat and a backrest thereof to each other, in a conventional seat reclining device, a method of adjusting the tilt angle of the backrest by using a differential transmission mechanism having gears is adopted. The differential transmission mechanism of the seat reclining device using the gears is described below with reference to FIG. 2 which is a cut-out sectional view showing a part of main parts of the conventional reclining device. In the description of an internal gear 1 of the differential transmission mechanism, FIG. 1 which is a cut-out sectional view showing a part of main parts of the seat reclining device of one embodiment of the present invention is used.

The conventional seat reclining device has the gear-provided differential transmission mechanism provided for the hinge connecting the seating surface of the seat and the backrest thereof to each other. The differential transmission mechanism has the internal gear 1 (see FIG. 1), an external gear 2, having a smaller number of teeth than the internal gear 1, which engages the internal gears 1, and a ring-shaped bearing bush 10 fitted in a shaft hole of the external gear 2. A pair of wedge-shaped pieces 16, 16' is disposed in a circular arc-shaped gap formed between the ring-shaped bearing bush 10 and a shaft 4 of the internal gear 1 (see FIG. 1) as well as a bearing bush 11 of the shaft 4 with tapered ends 16a, 16a' of the wedge-shaped pieces 16, 16' opposed to each other. The differential transmission mechanism further includes a compression coil spring 7 for imparting an elastic force to the wedge-shaped pieces 16, 16' in a direction in which the wedge-shaped pieces 16, 16' depart from each other. The bearing bush 11 provided on the shaft 4 of the internal gear 1 (see FIG. 1) and a projection 11a of the bearing bush 11 are operated. Thereby the wedge-shaped pieces 16, 16' move inside the circular arc-shaped gap with the wedge-shaped pieces 16, 16' in frictional sliding contact with the bearing bush 10. As a result, the external gear 2 separates from the internal gear 1 (see FIG. 1). Thereby the tilt angle of the backrest is adjustable.

Figure 3:
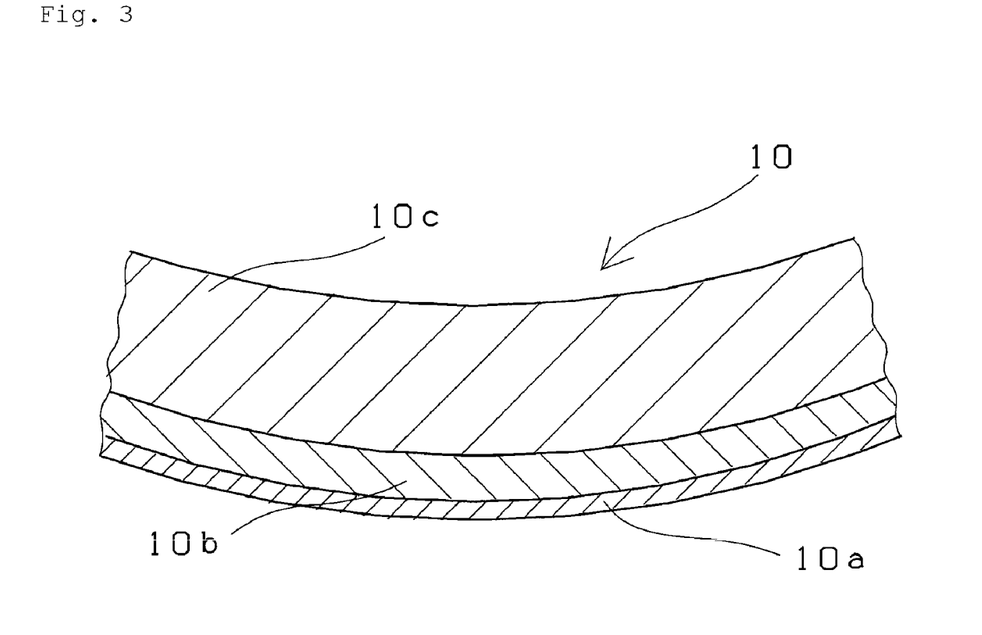
FIG. 3 is a sectional view showing a layered construction of a conventional bearing bush.

The above-described differential transmission mechanism is called a Taumeru mechanism. The seat reclining device of the car using the differential transmission mechanism has the bearing bush 10 disposed inside the external gear 2, as described above. The wedge-shaped pieces 16, 16' make frictional sliding contact with the bearing bush 10 (see patent documents 1 and 2). In any conventional seat reclining device of the car having the construction in which the wedge-shaped pieces 16, 16' make frictional sliding contact with the bearing bush 10, it is necessary to insert the bearing bush 10 into the external gear 2 by press fit to smoothen the operation of the wedge-shaped pieces 16, 16'. The sliding surfaces of the bearing bushes 10, 11 are made of resin excellent in the sliding property thereof. For example, as shown in FIG. 3, a multilayered bearing (bearing bush) is known. The multilayered bearing (bearing bush) has a layered structure composed of a back metal 10a, a porous sintered layer 10b, consisting of a sintered molding, which is layered on the back metal 10a, and a resin layer 10c, consisting of a slidable resin composition, a part of which is filled in pores of the porous sintered layer 10b.

As the multilayered bearing for the seat reclining device, a multilayered bearing having polytetrafluoroethylene (hereinafter referred to as PTFE) resin containing lead or lead oxide as a solid lubricant for a high surface pressure in its resin layer is conventionally used. But owing to the prohibition of the use of lead oxides caused by the issue of the ELV directive, the RoHS directive, and the like, the use of a multilayered bearing not containing the lead is demanded. For example, as the multilayered bearing not containing the lead, the multilayered bearing composed of the resin, containing the PTFE resin as its main component, to which at least the granular inorganic filler whose particles have an average diameter of 1 to 50 μm is added is known (see patent document 3).

But when the multilayered bearing, disclosed in the patent document 3, composed of the resin, containing the PTFE resin as its main component, to which at least the granular inorganic filler whose particles have the average diameter of 1 to 50 μm is added is used for the seat reclining device of a car seat, the multilayered bearing has sliding property inferior to that of the lead-containing multilayered bearing at a high surface pressure. In the seat reclining device disclosed in the patent document 3, the resin layer of the multilayered bearing and the wedge-shaped piece repeatedly frictionally contact each other. Therefore the seat reclining device disclosed in the patent document 3 has a problem that the resin layer of the multilayered bearing peels off the adjacent layer thereof and wears. A one-size larger bearing bush is adopted to solve the problem of the wear of the resin layer of the multilayered bearing. Alternatively a proposal of forming a sliding material having a low friction coefficient on the frictional sliding-contact surface of the wedge-shaped piece has been made (see patent document 4).

Patent document 1: Japanese Patent Application Laid-Open No. 03-237904
Patent document 2: Japanese Patent Application Laid-Open No. 2004-033401
Patent document 3: Japanese Patent Application Laid-Open No. 2002-327750
Patent document 4: Japanese Patent Application Laid-Open No. 2008-006265

SUMMARY OF THE INVENTION

The above-described conventional bearing bush, for the reclining device of the seat of a car or the like, which does not contain the lead or the lead compound so that it does not pollute environment does not have properties equivalent to those of the bearing bush containing the lead or the lead compound. The conventional bearing bush, for the reclining device of the seat of the car or the like, which does not contain the lead or the lead compound has another problem that the wedge-shaped piece makes a repeated frictional sliding contact with the resin layer of the bearing bush. Thereby the resin layer of the bearing bush peels off the adjacent layer thereof.

The present invention has been made in view of the above-described problems. It is an object of the present invention to provide a bearing bush, for a reclining device applicable to a car seat and the like, which can be used without using a one-size larger bearing bush and without forming a sliding material having a low friction coefficient on a frictional sliding-contact surface of a wedge-shaped piece. It is another object of the present invention to provide a seat reclining device, applicable to the car seat and the like, which has a differential transmission mechanism (Taumeru mechanism) improved in its durability and in which a resin layer of each of bearing bushes mounted inside an external gear and on a shaft of an internal gear does not peel off an adjacent layer nor gives rise to ply separation. It is still another object of the present invention not to use lead or a lead compound in any of a metallic base material, a porous sintered layer, and a resin layer of the bearing bush for the reclining device.

To achieve the objects of the present invention, a bearing bush, disposed in a shaft hole of an external gear of a seat reclining device, which slidingly contacts wedge-shaped pieces. The seat reclining device has a differential transmission mechanism for adjusting an open angle of a hinge connecting a seating surface of a seat and a backrest thereof to each other. The differential transmission mechanism has an internal gear; an external gear, having a smaller number of teeth than the internal gear, which engages the internal gear; a pair of the wedge-shaped pieces disposed in a circular arc-shaped gap formed between the shaft hole of the external gear and a shaft of the internal gear with tapered ends of the wedge-shaped pieces opposed to each other; and a compression coil spring for imparting an elastic force to the wedge-shaped pieces in a direction in which the wedge-shaped pieces depart from each other. When the wedge-shaped pieces are moved in sliding contact with the bearing bush inside the circular arc-shaped gap with the wedge-shaped pieces being pressed by a cam provided on the shaft of the internal gear, the external gear disengages from the internal gear, whereby the open angle of the hinge is adjustable. A sliding surface of the bearing bush is formed of a fluorocarbon resin composition containing fluorocarbon resin to which thermoplastic resin, carbon fibers, and molybdenum disulfide are essentially added.

The bearing bush is fixedly mounted in the shaft hole of the external gear; and a sliding surface of the bearing bush for the external gear and frictional sliding-contact surfaces of the wedge-shaped pieces make frictional contact. In another preferred embodiment, the bearing bush is fixedly mounted in the shaft of the internal gear; and a sliding surface of the bearing bush for the internal gear and frictional sliding-contact surfaces of the wedge-shaped pieces make frictional contact.

Other embodiments of the bearing bush of the present invention for the seat reclining device have the following characteristics.

The bearing bush has a metallic base material, a porous layer formed on one surface of the metallic base material, and the fluorocarbon resin composition impregnated into the porous layer and coating the porous layer therewith. The fluorocarbon resin composition is pressed into the porous layer to impregnate the fluorocarbon resin composition thereinto.

The fluorocarbon resin is PTFE resin.

The thermoplastic resin has a melting point of −50° C. to +20° C. in relation to a melting point of the fluorocarbon resin. The thermoplastic resin is at least one selected from among polyphenylene sulfide (hereinafter referred to as PPS) resin, polyether ether ketone (hereinafter referred to as PEEK) resin, and tetrafluoroethylene-perfluoroalkylvinyl ether copolymer (hereinafter referred to as PFA) resin.

An average length of the carbon fibers is not more than 100 µm. The carbon fibers are PAN-based.

The fluorocarbon resin composition contains 0.5 to 13 parts by weight of the thermoplastic resin, 2 to 20 parts by weight of the carbon fibers, and 4 to 35 parts by weight of the molybdenum disulfide for 100 parts by weight of the fluorocarbon resin. The fluorocarbon resin composition substantially consists of four components of the fluorocarbon resin, the thermoplastic resin, the carbon fibers, and the molybdenum disulfide. The above description "the fluorocarbon resin composition substantially consists of four components" means that other additives are not added to the fluorocarbon resin.

The porous layer is a sintered layer of a non-ferrous metal or a sprayed layer thereof. The metallic base material is a steel plate; and the non-ferrous metal of the porous layer is a metal softer than the steel plate. The non-ferrous metal is copper or a copper alloy containing the copper as a main component thereof. The steel plate is plated with a metal equivalent to the non-ferrous metal.

Other surface of the metallic base material is plated to prevent the other surface from corroding. The other surface of the metallic base material is plated with tin to prevent the other surface from corroding.

A seat reclining device of the present invention has a differential transmission mechanism for adjusting an open angle of a hinge connecting a seating surface of a seat and a backrest thereof to each other. The differential transmission mechanism having an internal gear; an external gear, having a smaller number of teeth than the internal gear, which engages the internal gear; a pair of the wedge-shaped pieces disposed in a circular arc-shaped gap formed between the shaft hole of the external gear and a shaft of the internal gear with tapered ends of the wedge-shaped pieces opposed to each other; and a compression coil spring for imparting an elastic force to the wedge-shaped pieces in a direction in which the wedge-shaped pieces depart from each other. When the wedge-shaped pieces are moved in sliding contact with the bearing bush inside the circular arc-shaped gap with the wedge-shaped pieces being pressed by a cam provided on the shaft of the internal gear, the external gear disengages from the internal gear, whereby the open angle of the hinge is adjustable. The bearing bush making frictional contact with frictional sliding-contact surfaces of the wedge-shaped pieces is fixedly mounted in the shaft hole of the external gear. The bearing bush is the above-described one. In another preferred embodiment, the bearing bush making frictional contact with frictional sliding-contact surfaces of the wedge-shaped pieces is fixedly mounted on the shaft of the internal gear. The bearing bush is the above-described one.

Other embodiments of the seat reclining device of the present invention have the following characteristics.

The wedge-shaped piece is a sintered molding of metal powder. A fluorocarbon resin film is formed on the frictional sliding-contact surfaces of the wedge-shaped pieces.

In the seat reclining device, the seat is a car seat.

The effect of the present invention is described below. As described above, the sliding surface of the bearing bush of the present invention for the seat reclining device is made of the fluorocarbon resin composition containing the fluorocarbon resin to which the thermoplastic resin, the carbon fiber, and the molybdenum disulfide are essentially added. Therefore although the bearing bush does not contain lead or a lead compound, the bearing bush is excellent in its resistance to a high load. Further although a one-size larger bearing bush is not adopted and although a sliding-contact material having a low friction coefficient is not formed on the frictional sliding-contact surfaces of the wedge-shaped pieces, it is possible to preferably use the bearing bush of the present invention for the seat reclining device. Therefore as described above, the bearing bush of the present invention can be preferably used as the bearing bush for the external gear by fixing the bearing bush thereto. Alternatively the bearing bush of the present invention can be preferably used as the bearing bush for the internal gear by fixing the bearing bush thereto.

As described above, in one embodiment of the present invention, the bearing bush comprises a metallic base material, a porous layer formed on one surface of the metallic base material, and the fluorocarbon resin composition impregnated into the porous layer and coating the porous layer therewith. Therefore the fluorocarbon resin composition of the sliding surface strongly adheres to the metallic base material and has a high peel resistance.

As described above, in one embodiment of the bearing bush of the present invention for the seat reclining device, the fluorocarbon resin composition is pressed into the porous layer to impregnate the fluorocarbon resin composition thereinto. Therefore the fluorocarbon resin composition has a higher peel resistance.

As described above, in one embodiment of the bearing bush of the present invention for the seat reclining device, the fluorocarbon resin is the PTFE resin. Therefore the bearing bush has a high resistance to heat generated by friction and an excellent sliding property and is inexpensive.

As described above, in one embodiment of the bearing bush of the present invention for the seat reclining device, the thermoplastic resin has a melting point of −50° C. to +20° C. in relation to the melting point of the fluorocarbon resin. Therefore in impregnating the resin composition into the porous layer and coating the porous layer therewith, the thermoplastic resin is capable of holding the fluorocarbon resin, the carbon fibers, and the molybdenum disulfide with the three-dimensional mesh structure. Thereby it is possible to improve the wear resistance of the fluorocarbon resin composition.

As described above, in one embodiment of the bearing bush of the present invention for the seat reclining device, the thermoplastic resin is at least one selected from among the PPS resin, the PEEK resin, and the PFA resin. Thus the thermoplastic resin is capable of improving the frictional property and wear resistance of the fluorocarbon resin composition.

As described above, in one embodiment of the bearing bush of the present invention for the seat reclining device, the average length of the carbon fibers is not more than 100 μm. Therefore the carbon fibers have an excellent dispersibility in the fluorocarbon resin composition and can be excellently impregnated into the porous layer. Thereby the fluorocarbon resin composition has a higher peel resistance.

As described above, in one embodiment of the bearing bush of the present invention for the seat reclining device, the carbon fibers are PAN-based. Thus the fluorocarbon resin composition has an improved strength and is excellent in its resistance to compression. Thereby a user can use the bearing bush without feeling that bearing bush has deteriorated with age in its performance.

As described above, in one embodiment of the bearing bush of the present invention for the seat reclining device, the fluorocarbon resin composition contains 0.5 to 13 parts by weight of the thermoplastic resin, 2 to 20 parts by weight of the carbon fibers, and 4 to 35 parts by weight of the molybdenum disulfide for 100 parts by weight of the fluorocarbon resin. Therefore the fluorocarbon resin composition is securely capable of obtaining excellent a low frictional property and excellent wear and peel resistances.

As described above, in one embodiment of the bearing bush of the present invention for the seat reclining device, the fluorocarbon resin composition substantially consists of four components of the fluorocarbon resin, the thermoplastic resin, the carbon fibers, and the molybdenum disulfide. Therefore the low frictional and wear-resistant properties of the fluorocarbon resin composition are stable.

As described above, in one embodiment of the bearing bush of the present invention for the seat reclining device, the porous layer is the sintered layer of the non-ferrous metal or the sprayed layer thereof. Therefore the porous layer is excellent in the strength of adhesion to the metallic base material.

As described above, in one embodiment of the bearing bush of the present invention for the seat reclining device, the metallic base material is a steel plate; and the non-ferrous metal of the porous layer is the metal softer than the steel plate. Therefore even if the fluorocarbon resin composition wears, the porous layer consisting of the soft metal prevents seizing, thus beforehand preventing the reclining device from having a locked state.

As described above, in one embodiment of the bearing bush of the present invention for the seat reclining device, the non-ferrous metal is the copper or the copper alloy containing the copper as the main component thereof. Thereby the porous layer enhances the effect preventing the seizing to a higher extent.

As described above, in one embodiment of the bearing bush of the present invention for the seat reclining device, the steel plate is plated with a metal equivalent to the non-ferrous metal of the porous layer. Therefore the steel plate and the porous layer adhere to each other to a high extent.

As described above, in one embodiment of the bearing bush of the present invention for the seat reclining device, other surface of the metallic base material is plated to prevent the other surface from corroding. Therefore it is possible to enhance the effect of preventing the metallic base material from corroding and extend the life of the bearing bush.

As described above, in one embodiment of the bearing bush of the present invention for the seat reclining device, the other surface of the metallic base material is plated with tin to prevent the other surface from corroding, which eliminates the need for worrying about the application of a load to environment and is adaptable to the ELV directive.

As described above, in the seat reclining device of the present invention, the bearing bush making the sliding contact with the frictional sliding-contact surfaces of the wedge-shaped pieces is fixedly mounted in the shaft hole of the external gear; and the bearing bush is the above-described one. Therefore it is possible to decrease the diameter of the bearing bush mounted on the external gear and unnecessary to form a sliding-contact material having a low friction coefficient on the frictional sliding-contact surfaces of the wedge-shaped pieces. Consequently it is possible to make the seat reclining device compact and produce it at a low cost.

As described above, in another seat reclining device of the present invention, the bearing bush making the frictional contact with the frictional sliding-contact surfaces of the wedge-shaped pieces is fixedly mounted on the shaft of the internal gear; and the bearing bush is the above-described one. Therefore it is possible to decrease the diameter of the bearing bush mounted on the internal gear and unnecessary to form the sliding-contact material having a low friction coefficient on the frictional sliding-contact surfaces of the wedge-shaped pieces. Consequently it is possible to make the seat reclining device compact and produce it at a low cost.

As described above, in one embodiment of the seat reclining device of the present invention, the wedge-shaped piece is the sintered molding of metal powder. Therefore it is possible to simply produce the wedge-shaped piece and produce the seat reclining device at a low cost.

As described above, in one embodiment of the seat reclining device of the present invention, the wedge-shaped piece, is the oil-containing sintered molding. Therefore the wedge-shaped piece has an improved sliding property in the sliding-contact with the bearing bush, which enhances the wear resistance of the bearing bush.

As described above, in one embodiment of the seat reclining device of the present invention, the fluorocarbon resin film is formed on the frictional sliding-contact surfaces of the wedge-shaped pieces. the wedge-shaped piece has an improved sliding property in the sliding-contact with the bearing bush, which enhances the wear resistance of the bearing bush.

As described above, in one embodiment of the seat reclining device of the present invention, the seat is a car seat. Therefore the reclining device of the car seat is excellent in its reclining operation and durability.

DETAILED DESCRIPTION OF THE PREFERRED EMBODIMENTS

Figure 1:
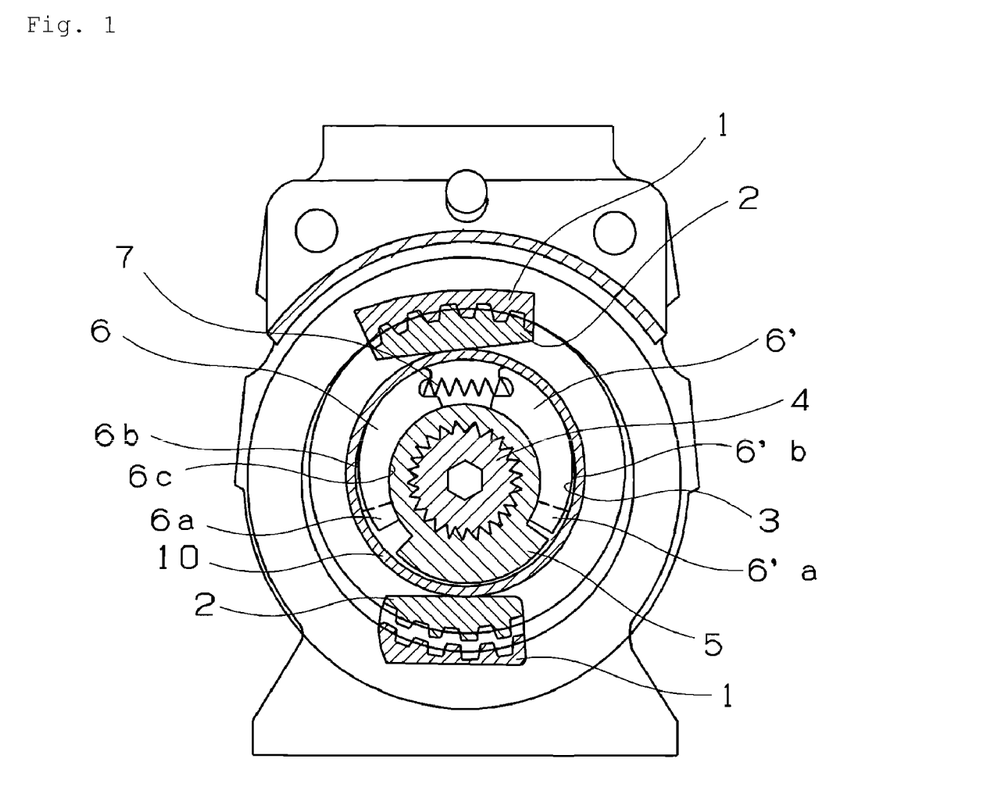
FIG. 1 is a cut-out sectional view showing a part of main parts of a seat reclining device of the present invention.
Figure 2:
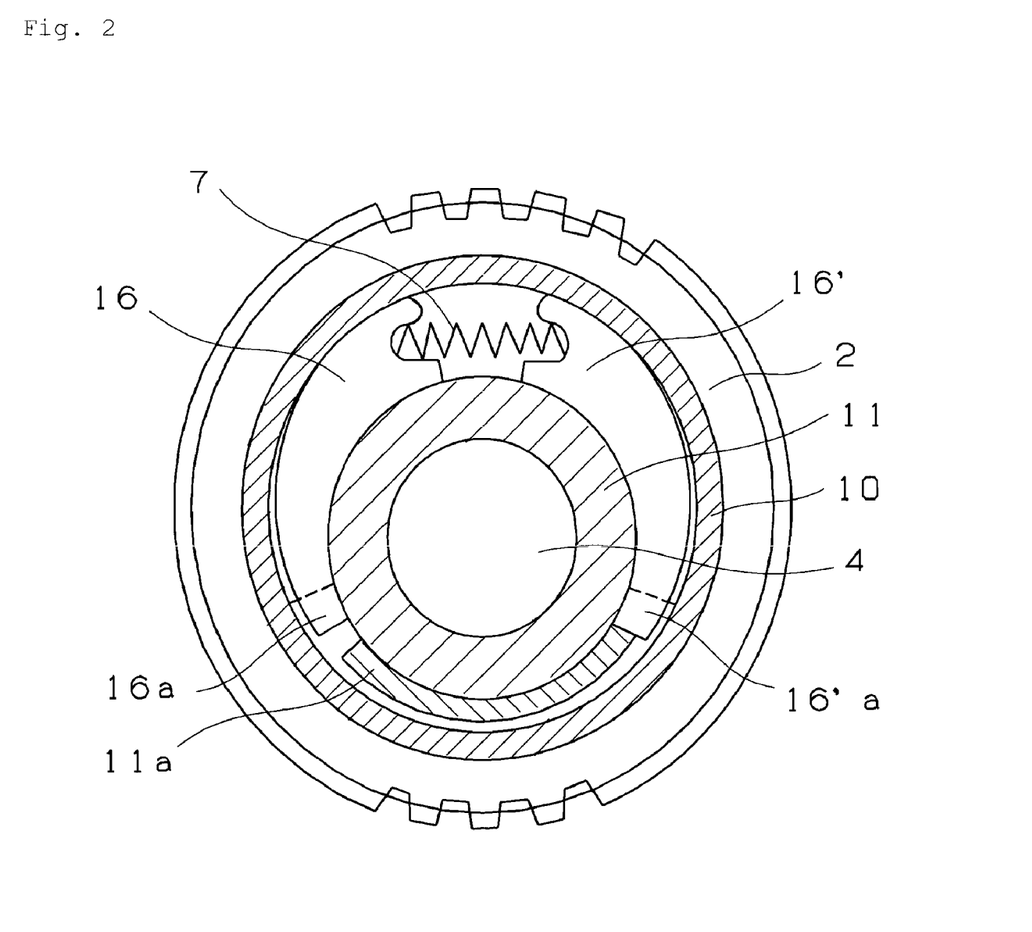
FIG. 2 is a cut-out sectional view showing a part of main parts of a conventional reclining device.

An embodiment of a bearing bush of the present invention for a seat reclining device and that of the seat reclining device are described below with reference to the drawings. FIG. 1 is a cut-out sectional view showing a part of main parts of the seat reclining device of one embodiment of the present invention. As shown in FIG. 1, the reclining device of the present invention has a differential transmission mechanism for adjusting an open angle of a hinge connecting a seating surface of a seat and a backrest thereof to each other. The differential transmission mechanism has an internal gear 1, an external gear 2, having a little smaller number of teeth than the internal gear 1, which engages the internal gears 1, a pair of wedge-shaped pieces 6, 6' disposed in a circular arc-shaped gap formed between a bearing bush 10, a sliding surface of which is made of resin and which is disposed in a shaft hole 3 of the external gear 2 and a small-diameter portion of a cam 5 integral with a shaft 4 of the internal gear 1 (see FIG. 1) with tapered ends 6a, 6a' of the wedge-shaped pieces 6, 6' opposed to each other.

The differential transmission mechanism further includes a compression coil spring 7 for imparting an elastic force to the wedge-shaped pieces 6, 6' in a direction in which the wedge-shaped pieces 6, 6' depart from each other. When the wedge-shaped pieces 6, 6' move in sliding contact with the bearing bush 10 inside the circular arc-shaped gap with the wedge-shaped pieces 6, 6' being pressed by the cam 5 integrally formed with the shaft 4 of the internal gear 1, the external gear 2 separates from the internal gear 1 and disengages therefrom. Thereby the open angle of the hinge is adjustable.

The sliding surface of the bearing bush 10 is formed by impregnating a predetermined resin layer into a porous layer such as a bronze sintered layer formed on a back metal thereof to improve the load resistance of the bearing bush 10 and coating the porous layer with the resin layer. The shaft 4 of the internal gear 1 may also be provided with a bearing bush. In this case, the inner peripheral surface of a pair of the wedge-shaped pieces 6, 6' and the peripheral surface of the bearing bush formed on the shaft 4 slidingly contact each other. Therefore a sliding surface is formed on the peripheral surface of the bearing bush formed on the shaft 4 of the internal gear 1.

It is necessary that the external gear 2 has a smaller number of teeth by not less than one than that of the internal gear 1. The number of the teeth of the external gear 2 is smaller by 1 to 10 and favorably 2 to 5 than that of the teeth of the internal gear 1. The number of the teeth of the external gear 2 is normally smaller by 1 to 3 than that of the teeth of the internal gear 1. The relationship between the number of teeth of the external gear 2 and that of the teeth of the internal gear 1 is not specifically limited.

It is necessary that the tapered end 6a of the wedge-shaped piece 6 and the tapered end 6'a of the wedge-shaped piece 6' are formed at one end thereof. It is possible to appropriately alter the details of the entire configuration of the wedge-shaped pieces 6, 6' and the extent of the curve thereof by design. The wedge-shaped pieces 6, 6' are formed of a sintered molding of metal powder. The compression coil spring 7 is shown as the spring for imparting an elastic force to the wedge-shaped pieces 6, 6' in the direction in which the wedge-shaped pieces 6, 6' depart from each other. In addition, as the form of the spring, it is possible to adopt known parts such as a damper, rubber, and elastic resin having an elastic operation.

Main frictional sliding-contact surfaces of the wedge-shaped piece 6 are an outer side surface 6b which slidingly contacts the bearing bush 10 of the external gear 2 and an inner side surface 6c which slidingly contacts the cam 5 integral with the shaft 4 of the internal gear 1. In the conventional reclining device, the outer side surface 6b which slidingly contacts the bearing bush 10 is demanded to be wear-resistant. Thus it is necessary to form a frictional sliding material having a low friction coefficient on the outer side surface 6b. On the other hand, the bearing bush of the present invention can be used without forming the frictional sliding material having a low friction coefficient thereon.

Figure 4:
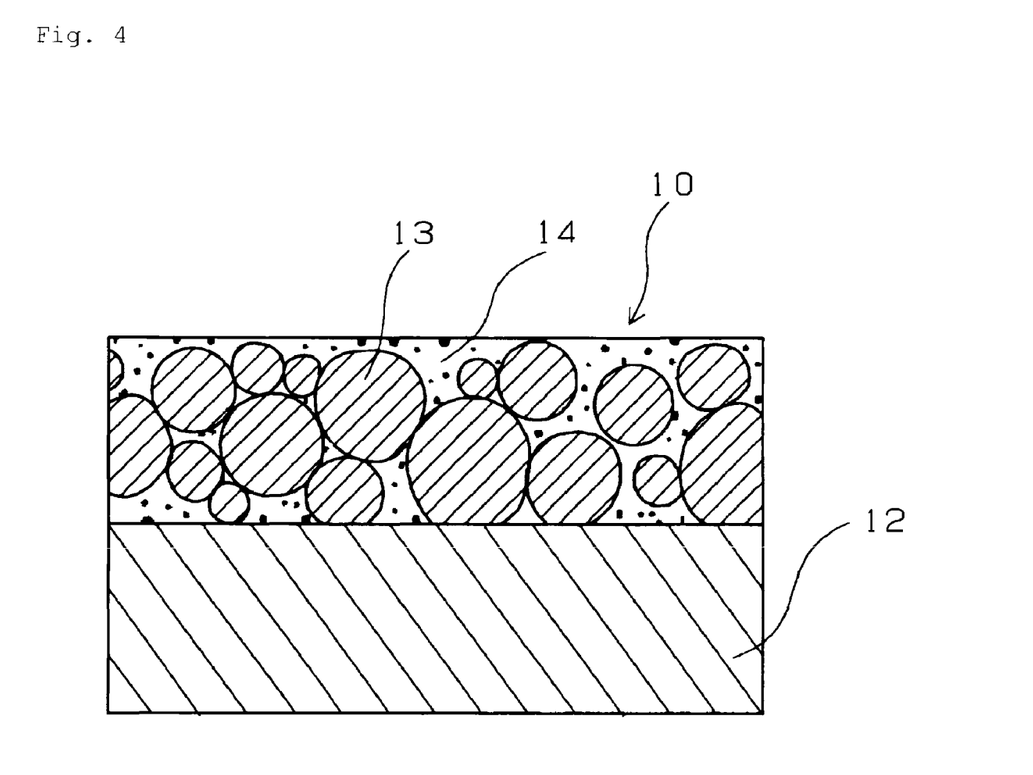
FIG. 4 is a sectional view showing a bearing bush for the seat reclining device of the present invention.

FIG. 4 shows an example of the bearing bush 10 of the present invention for the seat reclining device. FIG. 4 is a sectional view showing the bearing bush 10. The bearing bush 10 has a three-layer construction composed of metallic base material 12 made of a steel plate, a porous layer 13, made of a sintered metal, which is disposed on the surface of the metallic base material 12, and a fluorocarbon resin composition 14 impregnated into the porous layer 13 and coating the porous layer 13 therewith. The surface of the fluorocarbon resin composition 14 impregnated into the porous layer 13 and coating the porous layer 13 therewith acts as a sliding surface of the bearing bush 10. Thus the bearing bush 10 has an excellent sliding property under a high surface pressure. The fluorocarbon resin composition 14 contains the fluorocarbon resin to which the thermoplastic resin, the carbon fiber, and the molybdenum disulfide are added. The fluorocarbon resin composition is described below in detail.

The fluorocarbon resin which is the base resin of the fluorocarbon resin composition is known as synthetic resin having an excellent sliding property. As the fluorocarbon resins, the following resins are listed: PTFE resin, PFA resin, tetrafluoroethylene-hexafluoropropylene copolymer (hereinafter referred to as FEP) resin, tetrafluoroethylene-ethylene copolymer (hereinafter referred to as ETFE) resin, polychlorotrifluoroethylene, chlorotrifluoroethylene-ethylene copolymer resin, polyvinylpropylene-perfluoroolefin copolymer resin. Of these fluorocarbon resins, because any of the PTFE resin, the PFA resin, the FEP resin, and the ETFE resin has a melting point of not less than 260° C. and a temperature of not less than 150° C. in continuous use, these fluorocarbon resins have a sufficient resistance to heat generated by frictional sliding. Therefore these fluorocarbon resins are preferable as the base resin of the bearing bush for the seat reclining device.

Of the PTFE resin, the PFA resin, the FEP resin, and the ETFE resin, the PTFE resin has a high heat resistance because it has a melting point of 327° C. and a temperature of not less than 260° C. in continuous use. The PTFE resin has the highest sliding property and is comparatively inexpensive, which is especially preferable.

As the PTFE resin, it is possible to use general-purpose PTFE resin expressed by —$(CF_2—CF_2)_n$—. It is also possible to use modified PTFE resin containing the general-purpose PTFE resin into which perfluoroalkyl ether group (—$C_pF_{2p}$—O—) (p is an integer of 1 through 4) or polyfluoroalkyl group ($H(CF_2)_q$—) (q is an integer of 1 through 20) is introduced. Because the modified PTFE resin is superior to the general-purpose PTFE resin in its resistance to compression, the modified PTFE resin can be preferably used. It is possible to use the general-purpose PTFE resin and the modified PTFE resin in combination.

Both a suspension polymerization method of obtaining general-purpose molding powder and an emulsion polymerization method of obtaining fine powder may be adopted to obtain the PTFE resin and the modified PTFE resin. The PTFE resin and the modified PTFE resin have a number-average molecular weight (Mn) of favorably 500,000 to 10,000,000 and more limitedly 500,000 to 3,000,000. As the PTFE resin commercially available, Teflon (registered trademark) 7J (produced by Du Pont-Mitsui Fluorochemicals Company, Ltd.) can be exemplified. As the modified PTFE resin commercially available, it is possible to exemplify Teflon (registered trademark) TG70J (produced by Du Pont-Mitsui Fluorochemicals Company, Ltd.), Polyflon M111 and Polyflon M112 (produced by Daikin Industries, Ltd.), Hostaflon TFM1600 and Hostaflon TFM1700 (produced by Hoechst Co., Ltd.)

It is desirable that thermoplastic resin for use in the fluorocarbon resin composition has a melting point in a range from −50° C. to +20° C. in relation to the melting point of the fluorocarbon resin which is the base resin of the fluorocarbon resin composition. The thermoplastic resin is capable of holding the fluorocarbon resin having a poor binding action and carbon fibers or the molybdenum disulfide not having binding action with a three-dimensional mesh structure thereof. Therefore the fluorocarbon resin composition containing the thermoplastic resin is capable of connecting the components thereof with one another more firmly than the sintered PTFE resin. By holding the fluorocarbon resin with the three-dimensional mesh structure of the thermoplastic resin, it is possible to improve the disadvantageous wear resistance and creep resistance of the fluorocarbon resin. In the case of the thermoplastic resin having a melting point lower than the melting point, namely, −50° C. of the fluorocarbon resin, there is a fear that the thermoplastic resin thermally deteriorates at the step of calcining the fluorocarbon resin composition. In the case of the thermoplastic resin having a melting point higher than +20° C., there is a case in which the thermoplastic resin does not fuse at the step of calcining the fluorocarbon resin composition and a case in which the three-dimensional mesh structure of the thermoplastic resin is not formed.

When the PTFE resin (melting point: 327° C.) is used as the fluorocarbon resin, it is possible to use the PPS resin (melting point: 288° C.), the PEEK resin (melting point: 334° C.), and the PFA resin (melting point: 310° C.) as the thermoplastic resin. Because the PPS resin has a high effect of improving the wear resistance and creep resistance of the PTFE resin and is inexpensive, the PPS resin is most suitably used.

It is preferable that 0.5 to 13 parts by weight of the thermoplastic resin is added to 100 parts by weight of the fluorocarbon resin. When the mixing amount of the thermoplastic resin is less than 0.5 parts by weight, it is difficult to form the three-dimensional mesh structure and impossible to obtain the effect of improving the wear resistance and creep resistance of the fluorocarbon resin. When the mixing amount of the thermoplastic resin is more than 13 parts by weight, the thermoplastic resin inhibits the low frictional property of the fluorocarbon resin.

The carbon fibers to be used for the fluorocarbon resin composition are short milled fibers obtained by crushing the carbon fibers. Short fibers having an average length not more than 100 μm is desirable because they have an excellent dispersibility in the fluorocarbon resin composition and a high degree of impregnation into the porous layer. It is unnecessary to set the lower limit in the length of the carbon fibers, but the lower limit in the length thereof is about 20 μm because the carbon fibers having lengths about 20 μm keep the configuration thereof. As the short fibers having an average length not more than 100 μm, it is possible to use both a pitch-based carbon fiber and a PAN-based carbon fiber. The PAN-based carbon fiber is preferable because it has a high modulus of elasticity and reinforcing effect. Although the kind of the carbon fiber is not specifically limited, carbon fibers (carbonized carbon fibers) calcined at 1000° C. are more favorable than carbon fibers (graphitized carbon fibers) calcined at 2000° C. or at a temperature higher than 2000° C. It is possible to use carbon fibers calcined at a low temperature to allow the carbon fiber to have a low elasticity or carbon fibers calcined at a high temperature to allow the carbon fiber to have a high elasticity.

It is favorable that 2 to 20 parts by weight of the carbon fibers are added to 100 parts by weight of the fluorocarbon resin. When the mixing amount of the carbon fibers is less than 2 parts by weight, the effect of improving the wear resistance of the fluorocarbon resin composition is low. When the mixing amount of the carbon fibers is more than 20 parts by weight, the carbon fibers cannot be uniformly dispersed in mixing them with other components of the fluorocarbon resin composition. Further at the step of impregnating the fluorocarbon resin composition into the porous layer, the fluorocarbon resin composition is unfavorably impregnated thereinto. Thus there is a fear that unimpregnated portions are generated in the porous layer, which is unpreferable. It is more favorable that the mixing amount of the carbon fiber for 100 parts by weight of the fluorocarbon resin is 5 to 16 parts by weight.

As the carbon fibers commercially available, it is possible to list Torayca MLD30 (produced by Toray Industries, Inc., PAN-based carbon fiber, average fiber length: 30 μm, average fiber diameter: 7 μm), Tenax HTA-CMF0040-OH (produced by Toho Tenax Co., Ltd., PAN-based carbon fiber, average fiber length: 40 μm, average fiber diameter: 7 μm), Xylus GM100J (produced by Osaka Gas Co., Ltd., pitch-based carbon fiber, average fiber length: 100 μm, average fiber diameter: 12 μm).

The molybdenum disulfide to be contained in the fluorocarbon resin composition is widely used as a component of a solid lubricant such as resin, grease, and the like to be used for a radial bearing. The lubricating mechanism of the solid lubricant has a lamellar lattice structure and easily shears in a thin layer owing to a sliding motion so as to decrease a frictional resistance.

It is preferable that 4 to 35 parts by weight of the molybdenum disulfide are added to 100 parts by weight of the fluorocarbon resin. When the mixing amount of the molybdenum disulfide is less than 4 parts by weight, it is impossible to obtain the effect of decreasing the friction coefficient of the fluorocarbon resin composition and improving the wear resistance thereof. When the mixing amount of the molybdenum disulfide is more than 20 parts by weight, the molybdenum disulfide cannot be uniformly dispersed in mixing it with other components of the fluorocarbon resin composition. Further at the step of impregnating the fluorocarbon resin composition into the porous layer, the fluorocarbon resin composition is unfavorably impregnated thereinto. Thus there is a fear that unimpregnated portions are generated and that the mechanical strength of the fluorocarbon resin composition deteriorates. As commercially available molybdenum disulfide, Molykote Microsize (produced by Dow Corning Corporation) and Molypowder PA (produced by Sumico Lubricant Co., Ltd.) are listed.

In addition to the fluorocarbon resin, the thermoplastic resin, the carbon fibers, and the molybdenum disulfide, the fluorocarbon resin composition may contain other additives in a range in which the additives do not deteriorate its necessary properties such as its wear resistance, low frictional property, and resistance to compression and creep. The fluorocarbon resin composition consisting of the fluorocarbon resin, the thermoplastic resin, the carbon fibers, and the molybdenum disulfide is most stable in its low frictional and wear-resistant properties.

The above-described materials are dissolved or dispersed in a solvent to obtain a dispersion liquid. After the dispersion liquid is stirred to make it pasty, obtained paste is pressurized to impregnate it into the porous layer. Thereafter the solvent is removed. By calcining the paste to harden it, it is possible to obtain the fluorocarbon resin composition to be used for the bearing bush of the present invention for the seat reclining device.

In the bearing bush of the present invention for the seat reclining device, to securely obtain a high strength of the adhesion of the porous layer to the metallic base material, it is preferable to form the porous layer as a sintered layer of a non-ferrous metal or a sprayed layer thereof. As the non-ferrous metal, copper or a copper alloy containing the copper as its main component is preferable because they are excellent in the frictional wear property thereof. The sintered layer of the non-ferrous metal (copper alloy) can be obtained by spraying copper alloy powder on a steel plate in a thickness of 0.3 mm and heating the copper alloy powder to a temperature of 750 to 900° C. in a reducing atmosphere to sinter the copper alloy powder.

To enhance the strength of the adhesion of the porous layer to the metallic base material, it is preferable to plate the surface of the metallic base material on which the porous layer is to be formed with a metal equivalent to the non-ferrous metal of the porous layer.

As the metallic base material of the bearing bush of the present invention for the seat reclining device, it is possible to use steel (structural rolled steel such as SPCC) or metals other than the steel, for example, stainless steel or copper-based alloys such as bronze or the like. To prevent seizing when abnormal wear occurs during an operation, it is preferable to use a steel plate as the metallic base material and use a metal softer than the steel plate as the non-ferrous metal of the porous layer. By using the copper or the copper-based alloy containing the copper as its main component as the non-ferrous metal of the porous layer, it is possible to improve the effect of preventing the seizing to a high extent. The copper-based alloy does not contain lead.

To enhance the effect of preventing the metallic base material from corroding, it is preferable to plate the other surface (surface opposite to surface on which porous layer 13 is formed) thereof. It is preferable to plate the metallic base material with tin to eliminate concern that the plated metal applies a load to environment and use the bearing bush without being restricted by the ELV directive and the like.

In operating the differential transmission mechanism of the seat reclining device having the above-described construction, to adjust the open angle of the hinge connecting the seating surface of the seat and the backrest thereof to each other, the shaft 4 is rotated by operating a manual lever. Thereby the wedge-shaped pieces 6, 6' move in sliding contact with the bearing bush 10 inside the circular arc-shaped gap with the bearing bush 10 being pressed by the cam 5 formed integrally with the shaft 4 of the internal gear 1. Thereby the open angle of the hinge is adjustable or fixable. In switching the open angle-adjustable state to the open angle-fixable state and vice versa, the outer side surfaces 6*b*, 6'*b* of the wedge-shaped pieces 6, 6' slidingly contact the sliding surface of the bearing bush 10, thereby operating the differential transmission mechanism (Taumeru mechanism).

Because the sliding surface of the bearing bush 10 has the above-described construction, when the sliding surface of the bearing bush 10 slidingly contacts the wedge-shaped pieces, the sliding surface of the bearing bush 10 hardly lamellarly peels off the surface of the bearing bush 10 or hardly peels off the sintered layer forming the intermediate layer thereof or off the back metal.

To improve the wear resistance of the wedge-shaped piece 6 of the seat reclining device of the present invention, the wedge-shaped piece 6 is formed as an oil-containing sintered molding. Alternatively it is possible to form a sliding material such as a fluorocarbon resin film having a low friction coefficient on the friction sliding-contact surface of the wedge-shaped piece 6.

EXAMPLES

Materials contained in the resin compositions used in examples and comparative examples are shown below.
(1) PTFE resin: Teflon (registered trademark) 7J produced by Du Pont-Mitsui Fluorochemicals Company, Ltd.
(2) PPS resin: B160 (melting point: 288° C.) produced by Tosoh Corporation
(3) PEEK resin: PEEK450P (melting point: 334° C.) produced by Victrex-MC Inc.
(4) Polyimide resin: UIP-R (melting point: 400° C.) produced by Ube Industries, Ltd.
(5) PAN-based carbon fiber: Torayca MLD30 (length of fiber: 30 μm, diameter of fiber: 7 μm) produced by Toray Industries, Inc.
(6) Pitch-based carbon fiber 1: Xylus GM-100J (length of fiber: 100 μm, diameter of fiber: 12 μm) produced by Osaka Gas Co., Ltd.
(7) Pitch-based carbon fiber 2: Kreca Milled M101S (length of fiber: 130 μm, diameter of fiber: 14.5 μm) produced by Kureha Corporation
(8) Molybdenum disulfide: Molykote Z powder produced by Dow Corning Corporation
(9) Trilead Tetraoxide: Red lead No. 1 produced by Namariichi Chemical Co., Ltd.
(10) Calcium sulfate: produced by Dainichiseika Color & Chemicals Mfg. Co., Ltd.

Examples 1 through 6 and Comparative Examples 1 through 4

Figure 6:
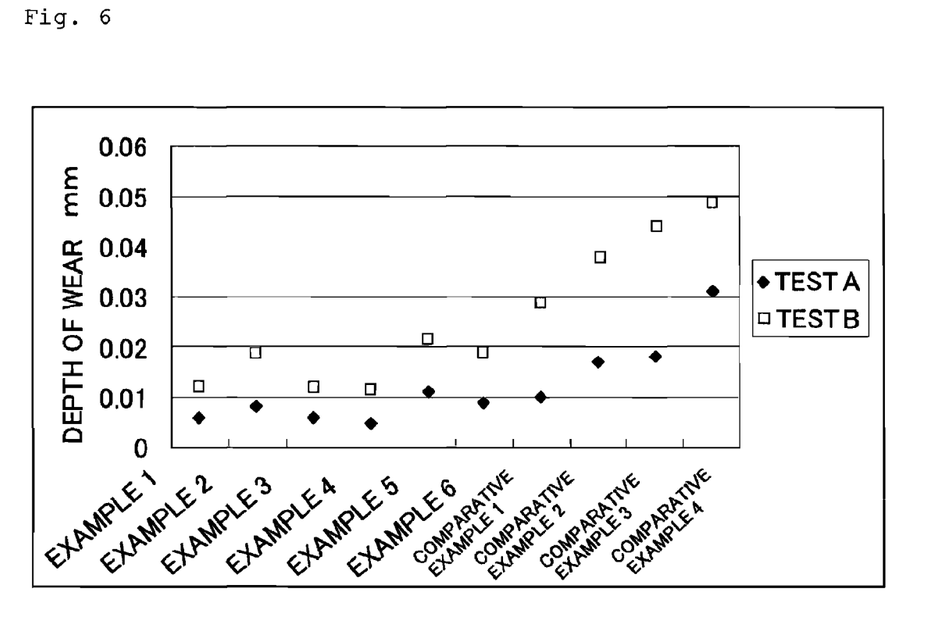
FIG. 6 shows results of measurements of the depth of wear.
Figure 7:
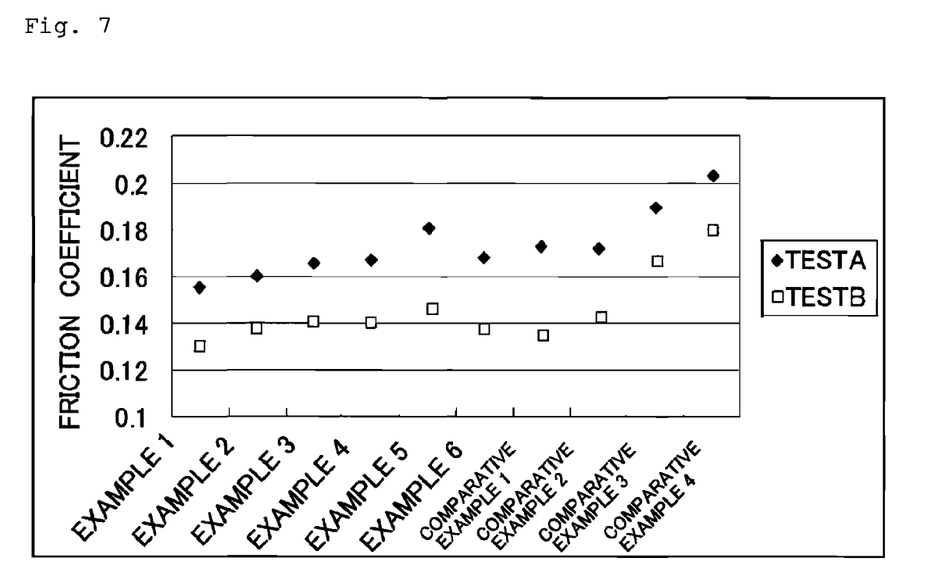
FIG. 7 shows results of measurements of friction coefficients.

Bronze powder (#100 mesh path, #200 mesh-on) was sprayed on one surface of a SPCC steel plate (Coppertite produced by Nisshin Steel Co., Ltd.) of each of the examples and the comparative examples having both surfaces copper-plated. Thereafter by heating and pressurizing each SPCC steel plate, a porous layer (layer of sintered metal) having a uniform thickness was formed thereon. After each of dispersion liquids of each resin composition (PTFE composition was contained in all resin compositions) prepared by mixing the components at the mixing ratio shown in table 1 was stirred to make each of dispersion liquids pasty, each paste was applied to each porous layer. After the solvent was evaporated in a dry oven, each paste was pressurized to impregnate a solid component into each porous layer and coat the porous layer therewith. Thereafter each resin composition was calcined to harden it. Each plate of the bearing bush obtained in the above-described manner was processed into a specimen having a configuration of 25 mm (width)×50 mm (length)×1 mm (thickness) to obtain reciprocating specimens. The obtained reciprocating specimens underwent a reciprocation test shown below to measure the friction coefficient and depth of wear of each reciprocating specimen. FIG. 6 shows the depth of wear. FIG. 7 shows the friction coefficient.

Reciprocation Test

Figure 5:
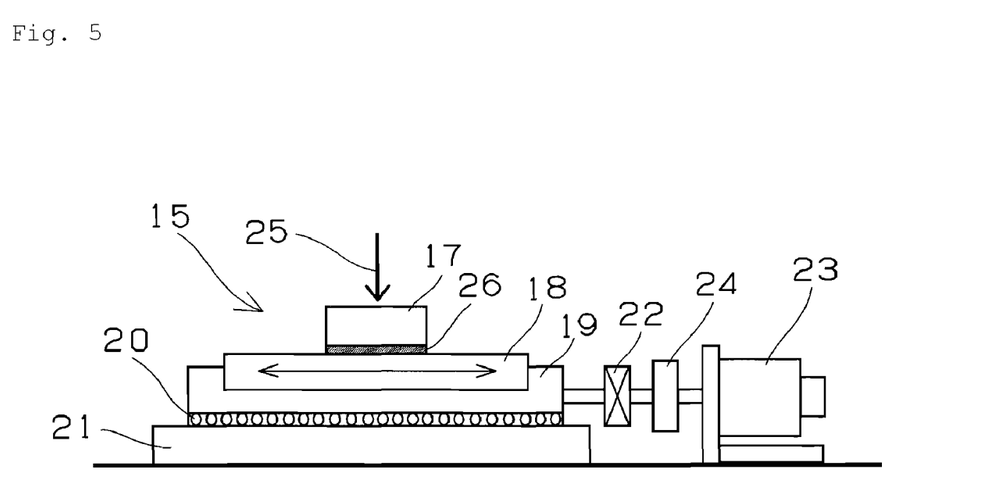
FIG. 5 is a schematic view showing a reciprocation tester.

A frictional wear test was conducted on a reciprocating specimen 26 of each of the each of the examples and the comparative examples by using a reciprocation tester 15 shown in FIG. 5. As shown in FIG. 5, the reciprocation tester 15 has a fixing jig 17 for fixing the reciprocating specimen 26, a mating material holder 19 for reciprocating on a fixing base 21 via a needle roller 20 with the mating material holder 19 holding a mating material 18, a hydraulic serve mechanism 23 allowing the mating material holder 19 to reciprocate on the fixing base 21 via a coupling 22, and a load cell 24 for detecting a frictional force. After each reciprocating specimen 26 is mounted on the fixing jig 17, a load 25 is applied to the fixing jig 17 to press the fixing jig 17 against the mating material 18 at the surface-pressure condition shown in table 2. In this condition, the mating material 18 is reciprocated to measure a friction coefficient generated on the sliding surface of each of the mating material 18 and that generated on the reciprocating specimen 26 with the load cell 24. When the reciprocation test finishes, the specimen 26 is removed from the fixing jig 17 to measure the depth of wear. As the reciprocation test, a reciprocation test A and a reciprocation test B are conducted at a low surface-pressure condition and a high surface-pressure condition shown in table 2.

TABLE 1

| Components of resin composition | Example | | | | | | Comparative example | | | |
|---|---|---|---|---|---|---|---|---|---|---|
| (parts by weight) | 1 | 2 | 3 | 4 | 5 | 6 | 1 | 2 | 3 | 4 |
| (1) PTFE resin | 100 | 100 | 100 | 100 | 100 | 100 | 100 | 100 | 100 | 100 |
| (2) PPS resin | 3 | 0.5 | 13 | — | 3 | 3 | 5 | — | — | — |
| (3) PEEK resin | — | — | — | 6 | — | — | — | — | 5 | 5 |
| (4) polyimide resin | — | — | — | — | — | — | — | 5 | — | — |
| (5) PAN-based carbon fiber | 8 | 2 | — | 20 | — | — | — | 8 | 10 | — |
| (6) Pitch-based carbon fiber 1 | — | — | 8 | — | — | 8 | — | — | — | — |
| (7) Pitch-based carbon fiber 2 | — | — | — | — | 10 | — | — | — | — | — |
| (8) molybdenum disulfide | 12 | 12 | 8 | 8 | 4 | 35 | — | 12 | — | 20 |
| (9) Trilead Tetraoxide | — | — | — | — | — | — | 20 | — | — | — |
| (10) Calcium sulfate | — | — | — | — | — | — | — | — | 13 | — |

TABLE 2

| | Reciprocation test A (Condition: Low surface pressure) |
|---|---|
| Unlubricated surface pressure, Mpa | 2 |
| Sliding speed, m/min | 3 |
| Stroke, nm | ±50 |
| Number of strokes | 800 |
| Lubrication | Unlubricated |
| Specimen size, nm | 25 × 50 × 1 |
| Mating material | SCM |
| Surface roughness of mating material: Ra, μm | 0.3 |

| | Reciprocation test B (Condition: High surface pressure |
|---|---|
| Unlubricated surface pressure, Mpa | 15 |
| Sliding speed, m/min | 3 |
| Stroke, nm | ±50 |
| Number of strokes | 3000 |
| Lubrication | Unlubricated |
| Specimen size, nm | 25 × 50 × 1 |
| Mating material | SCM |
| Surface roughness of mating material: Ra, μm | 0.3 |

As shown by the test results shown in FIGS. 6 and 7, each of the bearing bushes of the examples 1 through 6 of the present invention had a low friction coefficient in both the low and high surface-pressure conditions and excellent wear resistance. The bearing bushes of the comparative examples were inferior to those of the examples in the wear resistance thereof. Even the bearing bush of the comparative example 1 containing the lead compound was inferior to those of the examples in the wear resistance thereof.

The industrial applicability of the bearing bush of the present invention for the seat reclining device is described below. Although none of the metallic base material, the porous sintered layer, and the resin layer contains lead or the lead compound, the bearing bush is excellent in its resistance to a high load. Further although a one-size larger bearing bush is not adopted and although the sliding-contact material having a low friction coefficient is not formed on the frictional sliding-contact surfaces of the wedge-shaped piece, the resin layer of the bearing bush does not peel off the adjacent surface and ply separation does not occur. Therefore it is possible to preferably use the bearing bush of the present invention for the seat reclining device of a car seat and the like.

| Explanation of letters or numerals | |
| --- | --- |
| 1 | internal gear |
| 2 | external gear |
| 3 | shaft hole |
| 4 | shaft |
| 5 | cam |
| 6, 6', 16, 16' | wedge-shaped pices |
| 6a, 6'a | tapered end |
| 6b | outer side surface |
| 6c | inner side surface |
| 7 | compression coil spring |
| 10, 11 | bearing bush |
| 10a | back metal |
| 10b | porous sintered layer |
| 10c | resin layer |
| 11a | projection |
| 12 | base material |
| 13 | porous layer |
| 14 | fluorocarbon resin composition |
| 15 | reciprocation tester |
| 17 | fixing jig |
| 18 | mating material |
| 19 | mating material holder |
| 20 | needle roller |
| 21 | fixing base |
| 22 | coupling |
| 23 | hydraulic serve mechanism |
| 24 | load cell |
| 25 | load |
| 26 | reciprocating specimen |

What is claimed is:

1. A bearing bush, for a seat reclining device, disposed in a shaft hole of an external gear of said seat reclining device, which slidingly contacts wedge-shaped pieces, said seat reclining device comprising a differential transmission mechanism for adjusting an open angle of a hinge connecting a seating surface of a seat and a backrest thereof to each other, said differential transmission mechanism having an internal gear; an external gear, having a smaller number of teeth than said internal gear, which engages said internal gear; a pair of said wedge-shaped pieces disposed in a circular arc-shaped gap formed between said shaft hole of said external gear and a shaft of said internal gear with tapered ends of said wedge-shaped pieces opposed to each other; and a compression coil spring for imparting an elastic force to said wedge-shaped pieces in a direction in which said wedge-shaped pieces depart from each other, wherein when said wedge-shaped pieces are moved in sliding contact with said bearing bush inside said circular arc-shaped gap with said wedge-shaped pieces being pressed by a cam provided on said shaft of said internal gear, said external gear disengages from said internal gear, whereby said open angle of said hinge is adjustable, characterized in that a sliding surface of said bearing bush is formed of a fluorocarbon resin composition containing fluorocarbon resin to which thermoplastic resin, carbon fibers, and molybdenum disulfide are added, where said thermoplastic resin has a melting point of −50° C. to +20° C. in relation to a melting point of said fluorocarbon resin.

2. A bearing bush according to claim 1, wherein said bearing bush is fixedly mounted in said shaft hole of said external gear; and a sliding surface of said bearing bush for said external gear and frictional sliding-contact surfaces of said wedge-shaped pieces make frictional contact.

3. A bearing bush according to claim 1, wherein said bearing bush is fixedly mounted in said shaft of said internal gear; and a sliding surface of said bearing bush for said internal gear and frictional sliding-contact surfaces of said wedge-shaped pieces make frictional contact.

4. A bearing bush according to claim 1, 2 or 3, wherein said bearing bush comprises a metallic base material, a porous layer formed on one surface of said metallic base material, and said fluorocarbon resin composition impregnated into said porous layer and coating said porous layer therewith.

5. A bearing bush according to claim 4, wherein said porous layer is a sintered layer of a non-ferrous metal or a sprayed layer thereof.

6. A bearing bush according to claim 5, wherein said metallic base material is a steel plate; and said non-ferrous metal of said porous layer is a metal softer than said steel plate.

7. A bearing bush according to claim 6, wherein said steel plate is plated with a metal equivalent to said non-ferrous metal.

8. A bearing bush according to claim 5, wherein said non-ferrous metal is copper or a copper alloy containing said copper as a main component thereof.

9. A bearing bush according to claim 4, wherein other surface of said metallic base material is plated to prevent said other surface from corroding.

10. A bearing bush according to claim 9, wherein said other surface of said metallic base material is plated with tin to prevent said other surface from corroding.

11. A bearing bush according to claim 4, wherein said fluorocarbon resin composition is pressed into said porous layer to impregnate said fluorocarbon resin composition thereinto.

12. A bearing bush according to any one of claims 1 through 3, wherein said fluorocarbon resin is polytetrafluoroethylene resin.

13. A bearing bush according to any one of claims 1 through 3, wherein said thermoplastic resin is at least one selected from among polyphenylene sulfide resin, polyether ether ketone resin, and tetrafluoroethylene-perfluoroalkylvinyl ether copolymer resin.

14. A bearing bush according to any one of claims 1 through 3, wherein an average length of said carbon fibers is not more than 10 µm.

15. A bearing bush according to claim 14, wherein said carbon fibers are PAN-based.

16. A bearing bush according to any one of claims 1 through 3, wherein said fluorocarbon resin composition contains 0.5 to 13 parts by weight of said thermoplastic resin, 2 to 20 parts by weight of said carbon fibers, and 4 to 35 parts by weight of said molybdenum disulfide for 100 parts by weight of said fluorocarbon resin.

17. A bearing bush according to any one of claims 1 through 3, wherein said fluorocarbon resin composition substantially consists of four components of said fluorocarbon resin, said thermoplastic resin, said carbon fibers, and said molybdenum disulfide.

18. A seat reclining device comprising a differential transmission mechanism for adjusting an open angle of a hinge connecting a seating surface of a seat and a backrest thereof to each other, said differential transmission mechanism having an internal gear; an external gear, having a smaller number of teeth than said internal gear, which engages said internal gear; a pair of said wedge-shaped pieces disposed in a circular arc-shaped gap formed between said shaft hole of said external gear and a shaft of said internal gear with tapered ends of said wedge-shaped pieces opposed to each other; and a compression coil spring for imparting an elastic force to said wedge-shaped pieces in a direction in which said wedge-shaped pieces depart from each other, wherein when said wedge-shaped pieces are moved in sliding contact with said bearing bush inside said circular arc-shaped gap with said wedge-shaped pieces being pressed by a cam provided on said shaft of said internal gear, said external gear disengages from said internal gear, whereby said open angle of said hinge is adjustable, and said bearing bush making frictional contact with frictional sliding-contact surfaces of said wedge-shaped pieces is fixedly mounted in said shaft hole of said external gear; and said bearing bush is as claimed in claim 2.

19. A seat reclining device comprising a differential transmission mechanism for adjusting an open angle of a hinge connecting a seating surface of a seat and a backrest thereof to each other, said differential transmission mechanism having an internal gear; an external gear, having a smaller number of teeth than said internal gear, which engages said internal gear; a pair of said wedge-shaped pieces disposed in a circular arc-shaped gap formed between said shaft hole of said external gear and a shaft of said internal gear with tapered ends of said wedge-shaped pieces opposed to each other; and a compression coil spring for imparting an elastic force to said wedge-shaped pieces in a direction in which said wedge-shaped pieces depart from each other, wherein when said wedge-shaped pieces are moved in sliding contact with said bearing bush inside said circular arc-shaped gap with said wedge-shaped pieces being pressed by a cam provided on said shaft of said internal gear, said external gear disengages from said internal gear, whereby said open angle of said hinge is adjustable, and said bearing bush making frictional contact with frictional sliding-contact surfaces of said wedge-shaped pieces is fixedly mounted on said shaft of said internal gear; and said bearing bush is as claimed in claim 3.

20. A seat reclining device according to claim 18 or 19, wherein said wedge-shaped piece is a sintered molding of metal powder.

21. A seat reclining device according to claim 20, wherein said wedge-shaped piece is an oil-containing sintered molding.

22. A seat reclining device according to claim 20, wherein a fluorocarbon resin film is formed on said frictional sliding-contact surfaces of said wedge-shaped pieces.

23. A seat reclining device according to claim 18 or 19, wherein said seat is a car seat.

\* \* \* \* \*